Patented July 23, 1940

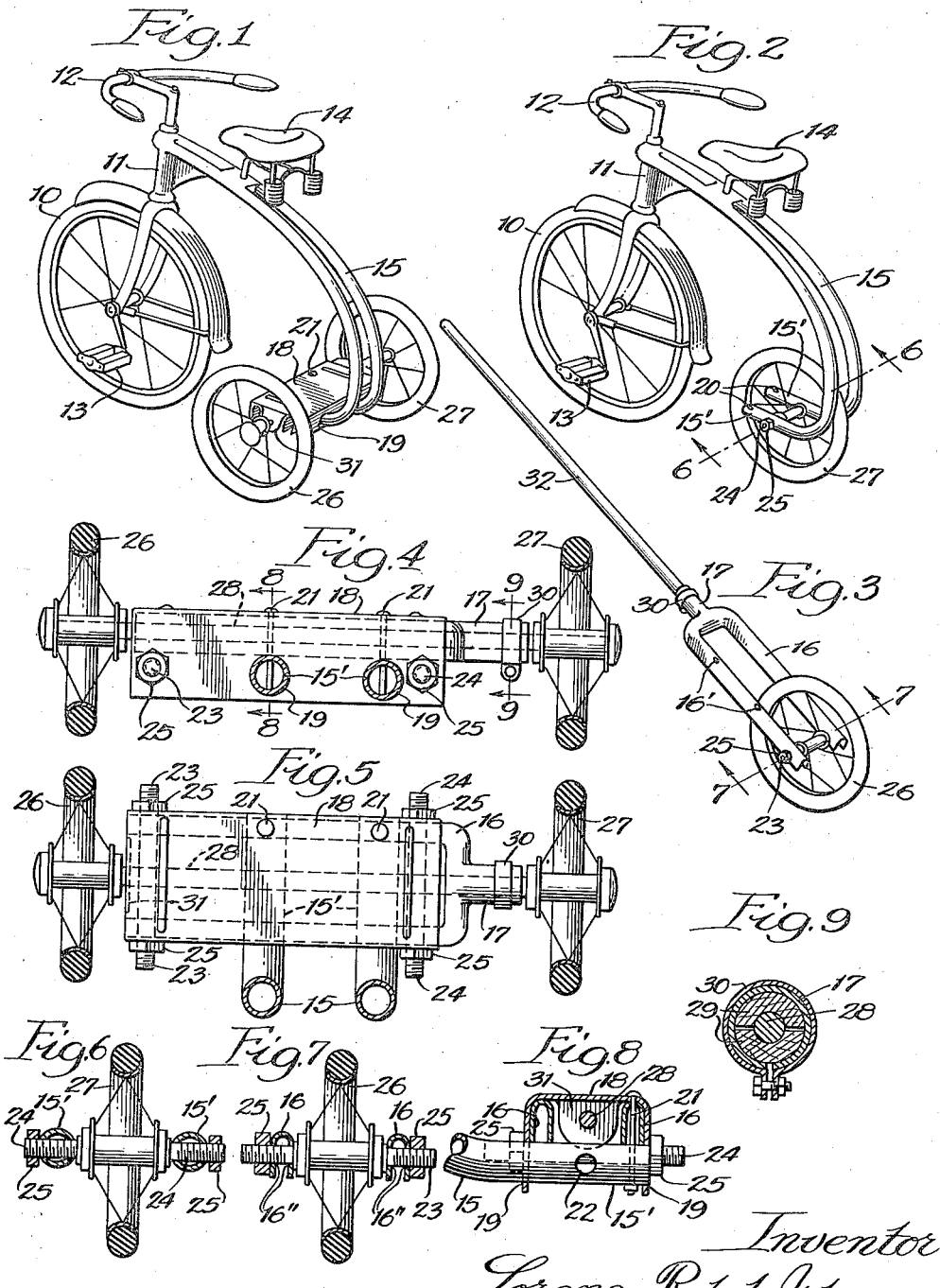
July 23, 1940. L. R. JOHNSON 2,209,058
CONVERTIBLE VEHICLE
Filed Aug. 31, 1938

2,209,058

UNITED STATES PATENT OFFICE 2,209,058

CONVERTIBLE VEHICLE

Lorenzo Ralph Johnson, Cleveland, Okla.

Application August 31, 1938, Serial No. 227,633

7 Claims. (Cl. 280—7.10)

This invention relates to vehicles, more particularly those designed for the use of children, such as tricycles, bicycles, wheel pushers, and the like; and the main purpose of the invention has been to design and provide a vehicle structure that, without the addition to any substantial extent of extra parts or fittings, may readily be converted from a tricycle to a bicycle, or to a toy in the nature of a "wheel pusher," or to both.

More specifically, one of the objects of the invention is to provide a vehicle for young children that can first be used as a tricycle, and, when the youngster has familiarized himself sufficiently with the operation of the tricycle, can be readily converted, by the dropping out of some of the parts and shifting the position of others, into a two-wheeler or bicycle, thereby providing a practically new sport involving the art of maintaining the body balanced while traveling, and, at the same time preparing him for the next step which is a modern chain drive bicycle.

At this stage of the child's advancement, that is, converting the tricycle into a two-wheeler, the youngster's activity becomes such that the wheel pusher seems to provide another enjoyment as well as a practical exerciser, and hence, in its most complete form, the invention has been designed to include, in its three-wheel or tricycle form, parts which, with the addition of a handle member or pole (such as a broom stick) can be assembled to form a wheel pusher.

Somewhat more comprehensively stated, it is the object of the present invention to provide these three mediums of amusement and exercise at little more than the cost of one alone. And, although I have referred to the device as a tricycle, then a two-wheeler, and then a single wheeler or wheel pusher, they can very easily be converted in the reverse order—that is, the two wheeler and the wheel pusher can be recombined into the three wheeler.

A practical and approved embodiment of the principle of the invention is illustrated in the accompanying drawing, in which—

Fig. 1 is a perspective view of the vehicle in the form of a three-wheeler or tricycle.

Fig. 2 is a similar view showing the vehicle converted into a two-wheeler or bicycle.

Fig. 3 is a similar view showing certain parts of the vehicle assembled, with the addition of a pole, such as a broom handle, to form a wheel pusher.

Fig. 4 is a rear elevation, partly in vertical section, of the rear axle assembly of the tricycle form of the vehicle.

Fig. 5 is a top plan view of the parts shown in Fig. 4, in horizontal section through the limbs of the saddle supporting frame member.

Fig. 6 is a vertical section on the line 6—6 of Fig. 2.

Fig. 7 is a vertical section on the line 7—7 of Fig. 3.

Fig. 8 is a vertical section on the line 8—8 of Fig. 4.

Fig. 9 is a vertical section on the line 9—9 of Fig. 4.

The front wheel 10, forked post 11, handle bar 12, pedals 13 and saddle 14 are, or may be, all as usual in a well-known form of child's tricycle.

The rear frame member or "backbone" of the vehicle has a forked lower portion 15 that terminates in a pair of forwardly bent substantially horizontal limbs 15'. As shown in Fig. 2, this forked lower portion is of sufficient spread to receive a single wheel and an axle therefor between the limbs thereof.

Describing first the three-wheeler or tricycle, the rear axle structure includes a step platform consisting, in the preferred form shown, of a step platform supporting frame which comprises a forked portion 16 and a longitudinally split tubular shank 17, and a step platform plate that consists of an inverted sheet metal channel member 18 that overlies and straddles the fork 16, as clearly shown in Fig. 8, the sides of the channel member depending below the fork. The sides of the channel member are apertured, as shown at 19 in Figs. 4 and 8, and through these apertures extend the limbs 15' of the fork 15. The ends of the limbs 15' are vertically apertured as shown at 20 (Fig. 2) to receive bolts 21 which extend through the top wall of the channel member 18 to thereby detachably lock the forked frame 15 to the step platform. As best shown in Fig. 8, the limbs 15' also have horizontal apertures 22, which are not used in the tricycle structure (Fig. 1) but are used in the bicycle form (Fig. 2) as hereinafter explained.

By reference to Fig. 5, it will be seen that the forked frame 15 is bolted to and crosswise of the step platform mainly to one side of the center line of the latter, so that the portion of the step platform to the left of the frame 15, viewing Fig. 5, is used when mounting the tricycle.

The side walls of the step platform plate 18 are bonded together by a pair of cross bolts 23 and 24 near the ends thereof, secured in place by nuts 25. These cross bolts 23, 24, as shown in Fig. 8, underlie the limbs of the fork 16 and cooperate with the bolts 21 in locking the rear platform frame and plate together in the tricycle form of the vehicle. These bolts 24 and 23 serve as axles in the bicycle and wheel pusher forms, as will be later pointed out.

The two rear wheels 26 and 27 are journaled on the end portions of a one-piece rear axle 28 which extends through and projects beyond the opposite sides of the step platform. The axle 28 is supported at two spaced points in the step platform. At one side of the latter it extends through the split stem or shank 17 and through a split wooden bushing 29 fitted into the latter, the shank and bushing being gripped on the axle by a clamp ring 30 (Fig. 9). Another bearing for the axle 28 at the other side of the step platform is conveniently formed by an apertured downwardly bent lug 31 (Fig. 8) at one side of the platform, this lug 31 being bent downwardly from the top member of the channel 18.

One limb of fork 16 has holes 16' for the bolts 21 (Figs 3 and 8).

To convert the three-wheeler or tricycle (Fig. 1) into the two-wheeler or bicycle (Fig. 2), the following steps may be followed. The wheel 27 on the right-hand side is first removed. The clamp ring 30 is then removed, whereupon the rear axle 28 may be pulled out, together with the wheel 26 on the opposite side. By removing the two bolts 21 that hold the forked frame 15 to the step platform, the latter may be pulled away from the supporting frame fork, and by removing the two bolts 23 and 24 at the ends of the step platform plate 18, the latter may then be removed from the step plate frame 16. The wheel 27 may then be inserted between the limbs 15' and the bolt 24 then inserted as an axle through the wheel hub and the holes 22 and secured by nuts 25, and this creates the two-wheeler or bicycle shown in Fig. 2.

If desired, the wheel pusher (Fig. 3) may then be built up by using the forked frame 16, inserting the other wheel 26 between the limbs of the fork, then entering the other bolt 23 through transverse apertures 16'' of the fork 16 (Fig. 7), applying the nuts 25, withdrawing the split bushing 29, inserting a pole handle 32 (which may conveniently consist of an old broom handle) into the split shank 17, and then tightening the clamp 30.

Thus, by disassembling the rear portion of the three wheel vehicle, the two wheel vehicle of Fig. 2 and the wheel pusher of Fig. 3 may be built up, as desired, substantially entirely from the structural parts of the three-wheeler or tricycle. A substantial economy is thus effected, since the user can purpose the tricycle and with the addition of an old broom handle can convert the tricycle into a bicycle and/or a wheel pusher, without the necessity of purchasing three separate and distinct wheeled toys.

During the winter months, when the sidewalks are icy, snowy, or not practical for the use of the two-wheeler, the two-wheeler can be converted back into a tricycle and used inside as a tricycle during this period.

Variations and modifications within the scope of the claims may be resorted to without departing from the substance of the invention or sacrificing any of the advantages thereof.

I claim:

1. In a vehicle structure parts of which are convertible from a tricycle into a bicycle, including a frame member having a forked lower portion of sufficient spread to receive only a single wheel and an axle therefor between the limbs thereof, said limbs being apertured to mount said axle, a step platform to which said forked lower portion is detachably secured, said step platform including an axle as an element thereof, and a pair of wheels journaled thereon on the opposite sides of said step platform respectively, either one of said pair of wheels adapted to serve as the aforesaid single wheel when converting the structure from a tricycle to a bicycle.

2. In a vehicle structure parts of which are convertible from a tricycle into a bicycle, including a frame member having a forked lower portion of sufficient spread to receive only a single wheel and an axle therefor between the limbs thereof, said limbs being apertured to mount said axle, a step platform of greater width than the width of said forked portion to and crosswise of one side portion of which said forked portion is detachably bolted, said step platform including an axle in the form of a bolt as an element thereof, and a pair of wheels journaled on said second axle on the opposite sides of said step platform respectively, either one of said pair of wheels adapted to serve as the aforesaid single wheel when converting the structure from a tricycle to a bicycle.

3. In a vehicle structure parts of which are convertible from a tricycle into a bicycle, including a frame member having a forked lower portion of sufficient spread to receive only a single wheel and an axle therefor between the limbs thereof, said limbs being apertured to mount said axle, a step platform to and crosswise of which said forked lower portion is detachably bolted, said step platform including a rear axle as an element thereof, a rear axle supported by and projecting beyond the ends respectively of said step platform, and wheels journaled on the projecting portions of said rear axle, either one of said wheels adapted to serve as the aforesaid single wheel when converting the structure from a tricycle to a bicycle.

4. In a vehicle structure parts of which are convertible from a tricycle into a bicycle, including a frame member having a forked lower portion of sufficient spread to receive only a single wheel and an axle therefor between the limbs thereof, said limbs being apertured to mount said axle, a step platform to and crosswise of which said forked lower portion is detachably bolted, said step platform comprising a step platform frame, a step platform plate covering said frame, and a bolt locking said plate on said frame, said bolt adapted to serve as said axle, a wheel axle support continuous with one end of said step platform frame, a wheel axle support continuous with the opposite end of said step platform plate, a rear axle mounted in said supports and projecting beyond the ends of said step platform, and wheels journaled on the projecting portions of said rear axle, either one of said wheels adapted to serve as the aforesaid single wheel when converting the structure from a tricycle to a bicycle.

5. In a vehicle structure parts of which are convertible from a tricycle into a bicycle, including a frame member having a forked lower portion of sufficient spread to receive only a single wheel and an axle therefor between the limbs thereof, said limbs being apertured to mount said axle, a step platform to and crosswise of which said forked lower portion is detachably bolted, said step platform comprising a step platform frame consisting of a two-prong fork having a tubular stem, a step platform plate consisting of an inverted channel member overlying and straddling said fork, and a bolt connecting the sides of said channel member, beneath said fork, said bolt adapted to serve as said axle, said channel member having at one end thereof a transverse lug formed with a hole in axial alinement with said tubular stem, a rear axle supported in said hole and tubular stem and projecting beyond the ends of said step platform, and wheels journaled on the projecting portions of said rear axle, either one of said wheels adapted to serve as the aforesaid single wheel when converting the structure from a tricycle to a bicycle.

6. In a vehicle structure parts of which are convertible from a tricycle into a bicycle and a wheel pusher, including a frame member having a forked lower portion of sufficient spread to receive only a single wheel and an axle therefor between the limbs thereof, said limbs being apertured to mount said axle, a step platform to and crosswise of which said forked lower portion is detachably bolted, said step platform comprising a forked step platform frame adapted to mount a pusher wheel in its fork and having a socketed member adapted to receive a push pole, a step platform plate overlying said frame, and a pair of bolts locking said plate on said frame, one of said bolts adapted to serve as an axle for said first named single wheel and the other as an axle for said pusher wheel, spaced axle supports on said step platform, a rear axle mounted on said spaced supports and projecting beyond the sides of said step platform, and wheels journaled on the projecting portions of said rear axle, either one of said wheels adapted to serve as said single wheel for the bicycle development and the other as said pusher wheel for the wheel pusher development.

7. In a vehicle structure parts of which are convertible from a tricycle into a bicycle and a wheel pusher, including a frame member having a forked lower portion of sufficient spread to receive only a single wheel and an axle therefor between the limbs thereof, said limbs being apertured to mount said axle, a step platform to and crosswise of which said forked lower portion is detachably bolted, said step platform comprising a step platform frame consisting of a two-prong fork having its limbs transversely apertured to mount a pusher wheel in said fork and a tubular stem adapted to receive a broom handle or like push pole, a step platform plate consisting of an inverted channel member overlying and straddling said fork, and a pair of bolts connecting the sides of said channel member beneath said fork, one of said bolts adapted to serve as an axle for said first named single wheel, and the other as an axle for said pusher wheel, alined rear axle supports, one in said tubular stem and the other at the opposite end of said channel member, a rear axle mounted in said supports and projecting beyond the sides of said step platform, and wheels journaled on the projecting portions of said rear axle, either one of said wheels adapted to serve as said single wheel for the bicycle development and the other as said pusher wheel for the wheel pusher development.

LORENZO RALPH JOHNSON.